Inventor:
Charles W. MacMillan
By
Gary, Parker, Juettner & Cullinan
Attys

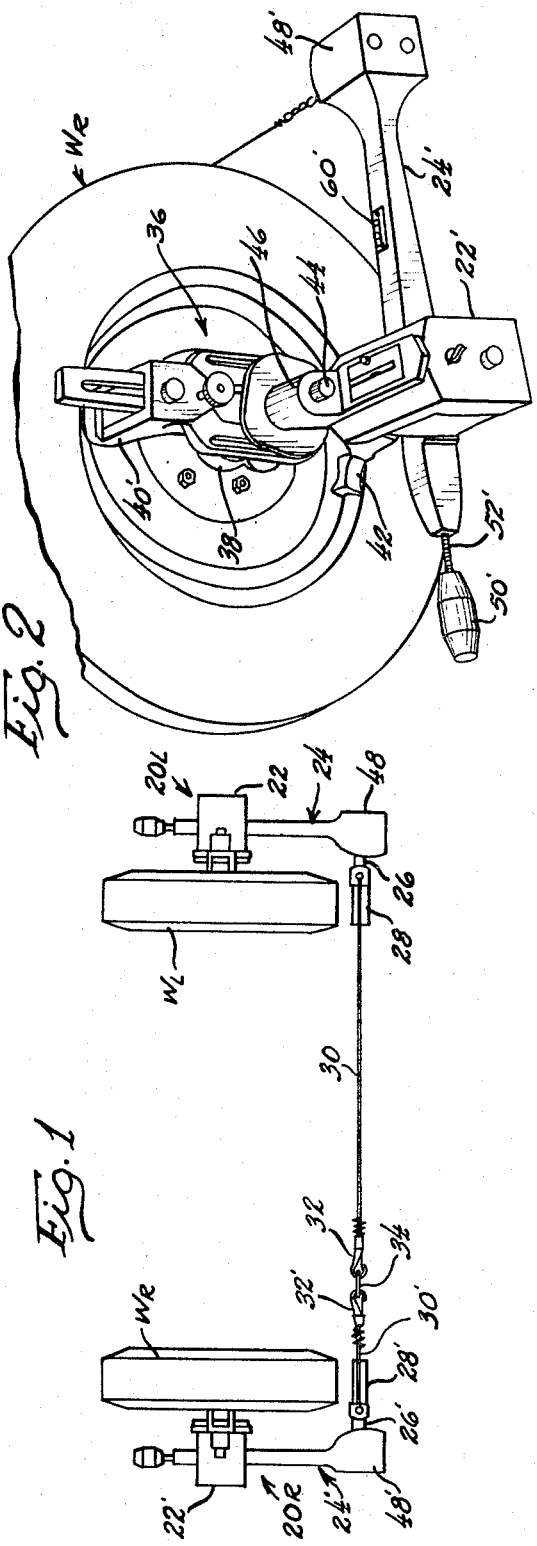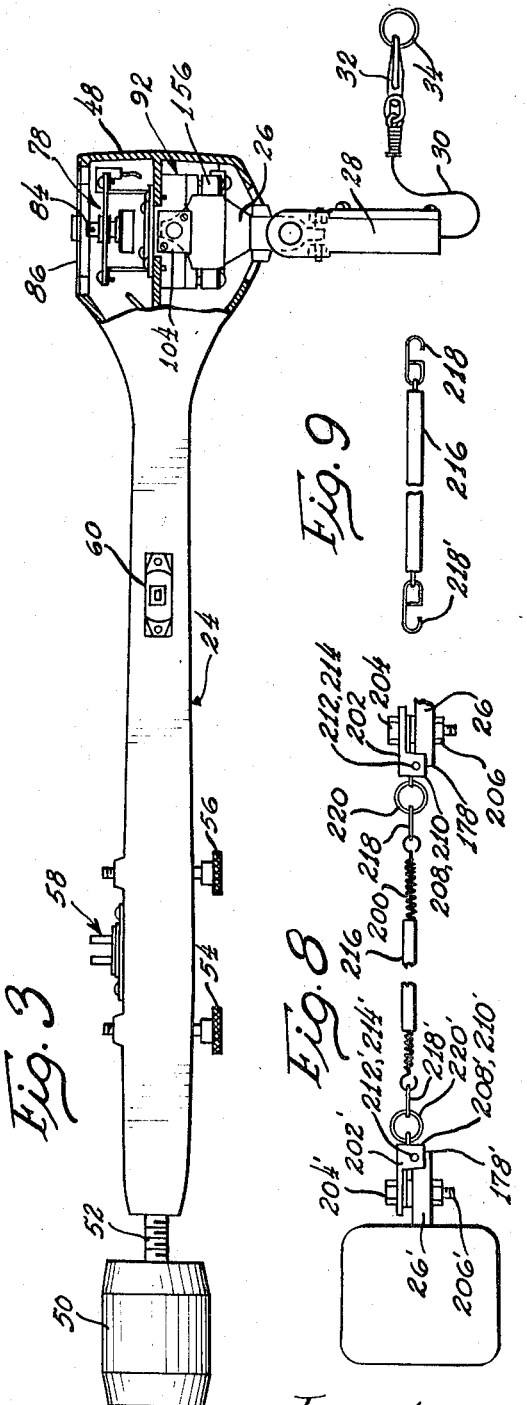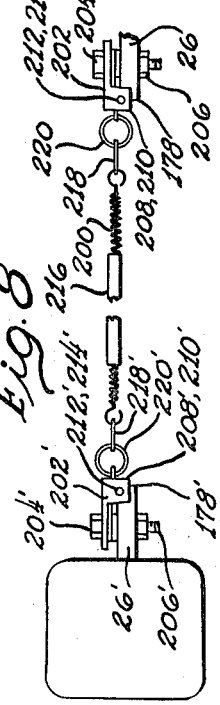

United States Patent Office 3,443,318
Patented May 13, 1969

3,443,318
AUTOMOTIVE WHEEL ALINING APPARATUS
Charles W. MacMillan, Rock Island, Ill., assignor to Bear Manufacturing Company, Rock Island, Ill., a corporation of Delaware
Filed Jan. 4, 1967, Ser. No. 607,274
Int. Cl. G01b 5/24, 7/30
U.S. Cl. 33—203.18                                    7 Claims

ABSTRACT OF THE DISCLOSURE

Apparatus for electrically measuring the toe of vehicle wheels including a pair of toe arms each suspended from a respective front wheel of a vehicle and each arm carrying a pendulum which is movable about a vertical axis, a tension member stretched between the free ends of the two pendulums, and electromagnetic means associated respectively with each of the pendulums for producing a current the magnitude of which is a measure of the angular position of the corresponding pendulum and thus is a measure of the toe of the corresponding vehicle wheel.

Brief summary of the invention

It is known in the art to provide electrical apparatus including an armature-carrying pendulum and an adjacent exciter coil and two pick-up coils for the purpose of measuring the caster and camber of vehicle wheels. In the operation of such apparatus the armature-carrying pendulum moves adjacent the exciter coil and pick-up coils in such a manner that the reluctance of the magnetic paths from the exciter core to the cores of the pickup coils is changed by the swing of the pendulum. A properly calibrated current measuring instrument is employed to measure the unbalanced condition of the current through the two pick-up coils in order to interpret the angular position of the pendulum in terms of current flow. Such apparatus is fully described in MacMillan et al. U.S. Patent 2,765,-540, which is assigned to the assignee of the present invention.

The foregoing electrical wheel alinement apparatus has been used successfully in measuring the caster and camber of vehicle wheels. Such apparatus utilizes a pendulum which is freely swingable about a horizontal axis, and while advantageous for use in measuring caster and camber, it has not heretofore been considered as having any application as a means for determining wheel toe. In the above-identified U.S. Patent 2,765,540, and in a division thereof, MacMillan et al. U.S. Patent 2,923,067, there is also described toe measuring means including a pendulum type member having an abutment plate which moves about a vertical axis and acts through a gear and pinion mechanism to vary a resistance in an electrical bridge circuit so that the current unbalance in the bridge circuit is proportional to the angular position of the pendulum member.

In operation the foregoing known toe measuring instrument is mounted from a vehicle wheel with the pendulum type abutment member facing outwardly away from the wheel, and a reference plate mounted on a fixed support or runway for the vehicle wheels is moved into face-to-face contact with the pendulum type abutment member. The reference plate is oriented with its plane vertical and substantially parallel to the longitudinal axis of the vehicle, and when brought into face-to-face contact with the pendulum type abutment member it controls the angular position of the latter, such angular position being a measure of the wheel toe and being determined by measuring the current unbalance in the above-mentioned electrical bridge circuit. However, the foregoing device requires the use of two reference plates, one carried on each side of the wheel runway, for cooperation with the instruments mounted on the two front vehicle wheels, and the use of such reference plates presents various difficulties, particularly since the wheel base dimension will vary substantially from vehicle to vehicle. Moreover, the accuracy of the toe reading depends not only upon the electrical circuitry but also upon the accuracy of the mounting of the two reference plates on the wheel runway since the latter must be perfectly parallel to one another, and the vehicle must also be squared up on the racks or runway.

It is an object of the present invention to provide an improved pendulum type mechanism which accurately measures wheel toe by measuring an electrical current which is proportional thereto and yet does not require the use of any reference plates or other apparatus mounted from the wheel runway and does not require that the vehicle be squared up on the runway.

Another object of the invention is to provide an improved electro-mechanical toe measuring device which is extremely accurate and also exceptionally easy to operate and which may be applied with equal facility to virtually any vehicle regardless of the wheel base dimension thereof.

The foregoing and other objects and advantages of the invention will be apparent from the following description thereof.

Now, in order to acquaint those skilled in the art with the manner of making and using my invention, I shall describe, in conjunction with the accompanying drawings, a preferred embodiment of the invention.

Description of the drawings

FIGURE 1 is a top plan view showing the toe measuring apparatus of the present invention mounted on the front wheels of a vehicle, such apparatus including a pair of toe arms, one mounted on each vehicle wheel and each equipped with a pendulum member, and the two oppositely disposed pendulum members being interconnected by a tension member;

FIGURE 2 is a perspective view showing in greater detail the toe arm and related apparatus which is mounted on the right front vehicle wheel;

FIGURE 3 is a top plan view, partly in section, of the toe arm member which is adapted for mounting from the left front vehicle wheel;

FIGURE 8 is an elevational view of an alternative embodiment of the invention where a tension spring is stretched between the two oppositely disposed pendulum members; and FIGURE 9 is an elevational view showing the tension spring of FIGURE 8 in its retracted position.

Detailed description of the invention

Figure 4:
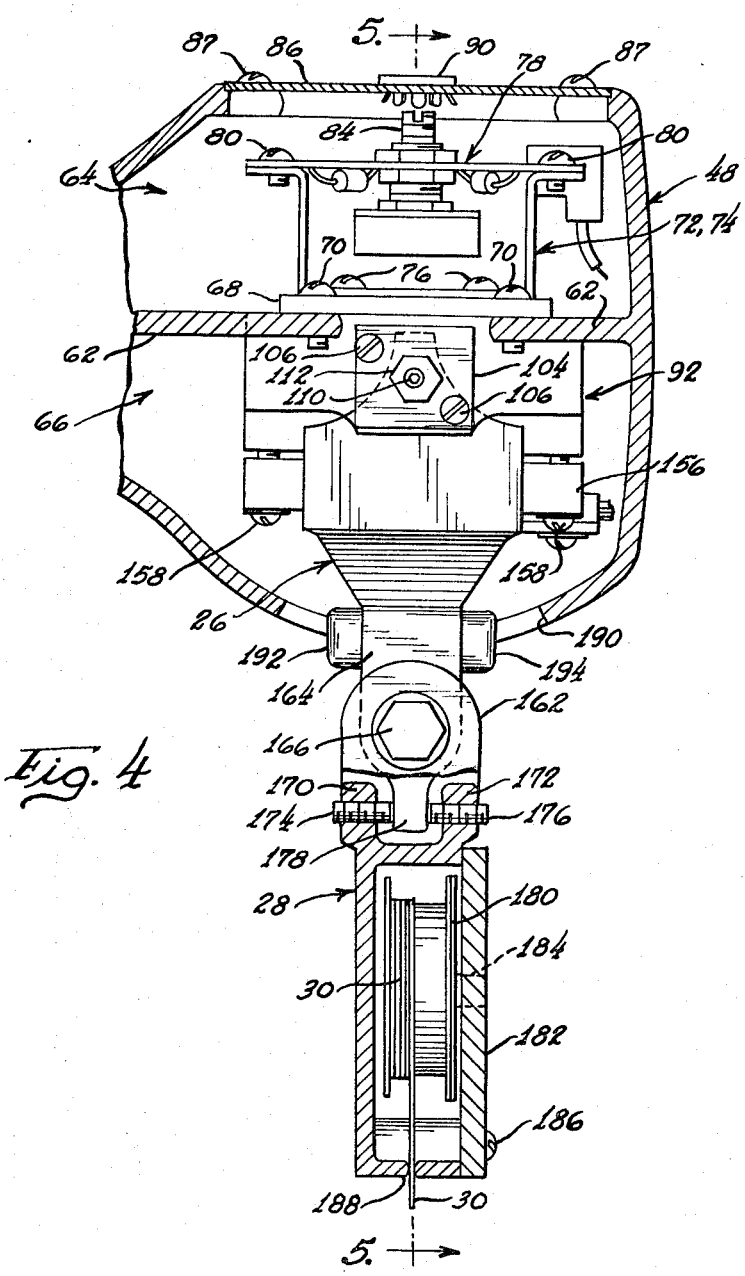
FIGURE 4 is an enlarged fragmentary horizontal sectional view of the head portion of the toe arm of FIGURE 3.

Referring now to the drawings, FIGURE 1 shows a pair of toe measuring devices 20L and 20R mounted on the left front and right front wheels $W_L$ and $W_R$ of a vehicle (not shown). The device 20L comprises a caster-camber measuring unit 22 which is fully described in the above-mentioned U.S. Patent 2,765,540, and a toe arm member 24 which in the embodiment being described is fixedly mounted to the caster-camber unit 22 and electrically connected therewith. The oppositely disposed device 20R comprises a caster-camber measuring unit 22' and a toe arm member 24' which is fixedly mounted to the unit 22' and electrically connected thereto. The toe arms 24 and 24' carry pendulums 26 and 26' in the head portions thereof, and such pendulums have connected thereto a pair of spring reels or the like 28 and 28', respectively. While the term pendulum is used herein to describe the members 26 and 26', it should be understood that these members do not hang from a horizontal axis as in the case of a conventional pendulum. Instead, the members 26 and 26' are each supported for pivotal movement about a vertical axis, and thus their movement is not controlled by forces of gravity. Accordingly, the term pendulum as used herein should be interpreted having the foregoing in mind. In operation, a cable 30 is drawn from the reel 28 and a cable 30' is drawn from the reel 28', such cables being drawn transversely across the vehicle in front of the wheels $W_L$ and $W_R$, and the ends of the cables being attached to one another by means of a pair of spring snaps 32 and 32' and a connecting ring 34. The structure and mode of operation of the foregoing apparatus will be described more fully hereinafter.

FIGURE 2 shows a wheel clamp assembly indicated generally at 36 and preferably comprising an adapter 38 which engages against the machined end face of the wheel hub (not shown) in combination with a rim clamp 40, 42 which firmly attaches to the wheel rim and serves to support an adapter spindle 44 which is fixedly carried by the adapter 38. The foregoing wheel clamp assembly 36 is fully described in my copending application, Ser. No. 576,752, filed Sept. 1, 1966, and assigned to the assignee of the present invention. As pointed out in the latter copending application, the adapter spindle 44 is supported so as to constitute a true extension of the wheel spindle. It should be understood however that the present invention is not limited to the use of any particular attaching means for mounting the toe measuring apparatus from the wheel, and any conventional rim clamp or magnetic adapter or the like may be utilized. In the present embodiment it will be seen that the caster-camber unit 22' is provided with a mounting lug 46 having an aperture therein which permits the unit to be freely suspended from the adapter spindle 44.

Referring now to FIGURE 3, there is shown the left hand toe arm 24 having a head 48 at one end thereof, and at the opposite end a counterweight assembly including a counterweight 50 and a threaded shaft 52 is threaded into the toe arm. A pair of adapter screws 54 and 56 extend through the toe arm 24 and are threaded into the caster-camber unit 22 in order to rigidly mount the toe arm to the unit 22. In addition, a male plug assembly 58 cooperates with a plug (not shown) on the caster- camber unit 22 in order to electrically connect the toe arm 24 to the latter unit. A spirit level 60 is mounted on the top of the toe arm 24 and in operation, as will be described more fully hereinafter, the assembly of the caster-camber unit 22 and the toe arm 24 is suspended on the adapter spindle 44 so as to be free to pivot on the latter, and while observing the spirit level 60 the counterweight 50 is adusted in order to balance the toe arm.

The pendulum 26 and related apparatus contained within the toe arm head 48 will now be described in conjunction with FIGURES 4–7. The head portion 48 of the toe arm 24 is provided with an apertured partition or wall 62 defining a first compartment 64 and a second compartment 66. In the compartment 64 a mounting plate 68 is fastened to the wall 62 by a plurality of screws 70, and a pair of U-shaped mounting brackets 72 and 74 are fastened to the mounting plate 68 by screws 76. A circuit board assembly indicated generally at 78 is disposed in the compartment 64 and fastened to the brackets 72 and 74 by a plurality of screws 80. The circuit board assembly 78 includes a pair of adjusting screws 82 and 84 (see FIGURE 5) which serve to adjust toe calibration and toe zero potentiometers in the circuit, and a cover plate 86 secured to the head 48 by screws 87 is provided with removable plug buttons 88 and 90 to permit access to the adjusting screws for the purpose of calibrating the toe measuring apparatus.

A pivot mounting member indicated generally at 92 is disposed in the compartment 66 and secured to the mounting plate 68 by the screws 76 which as previously described also serve to secure the mounting brackets 72 and 74 to the opposite side of the mounting plate 68. As best shown in FIGURE 5, the pivot mounting member 92 includes a pair of oppositely disposed bearing supports 94 and 96 which mount a pair of ball bearings 98 and 100. A pivot shaft 102 extends between the bearing supports 94 and 96 and has its ends rotatably supported in the ball bearings 98 and 100. A bearing cap 104 is secured to the bearing support 96 by a pair of screws 106 (see FIGURE 4). A bearing ball 108 is disposed in a recess formed in the end of the pivot shaft 102, and the ball is maintained in position therein by a set screw 110 which is carried by the bearing cap 104 and held in a predetermined position by a nut 112. In a similar fashion, a bearing cap 114 is secured to the bearing support 94 by a pair of screws 116, and a bearing ball 118 is disposed in a recess formed in the opposite end of the pivot shaft 102 and held therein by a set screw 120 which is carried by the bearing cap 114 and held in a predetermined position by a nut 122.

FIGURE 5 shows the manner in which the pendulum 26 is mounted on the pivot shaft 102 for rotation therewith. It will be seen that the pendulum 26 includes a sleeve portion 124 having a bore 126 therein for receiving the pivot shaft 102, and the sleeve is fixed relative to the pivot shaft by a pair of set screws 128 and 130. It will now be understood that the pendulum 26 is rotatable with the pivot shaft 102, and the latter is supported in a substantially frictionless manner by the ball bearings 98 and 100 and the bearing balls 108 and 118. The pendulum 26 is provided with a transverse slot 132 (see FIGURE 7), and mounted in the slot is an armature 134 comprising a plurality of stacked ferro-magnetic lamina 136 of a length substantially equal to the length of the slot 132. The lamina 136 are secured in stacked relationship by a pin 138 which extends therethrough and has its ends disposed in recesses 140 and 142 provided therefor in the pendulum body. The pendulum body is preferably peened along the edges of the slot 132 and recesses 140 and 142 in order to firmly secure the lamina 136 and pin 138 therein.

Figure 5:
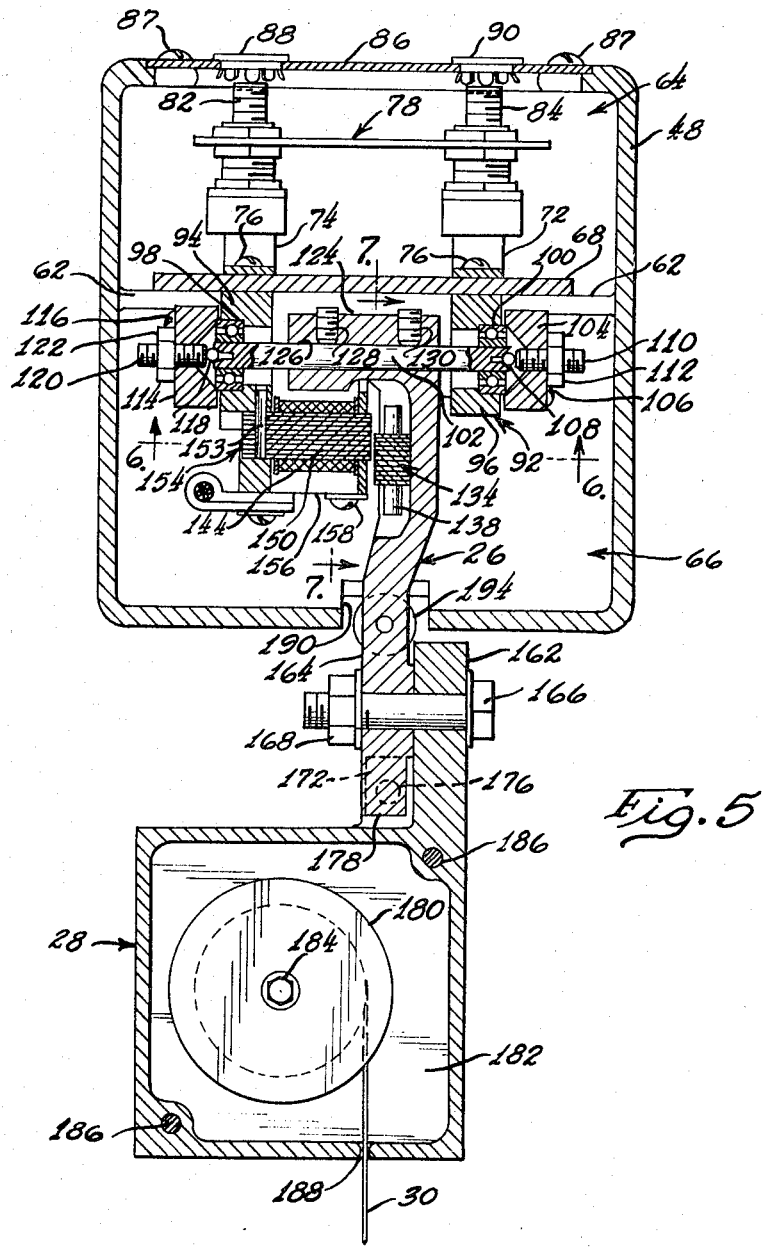
FIGURE 5 is a sectional view taken substantially along the line 5—5 of FIGURE 4.
Figure 6:
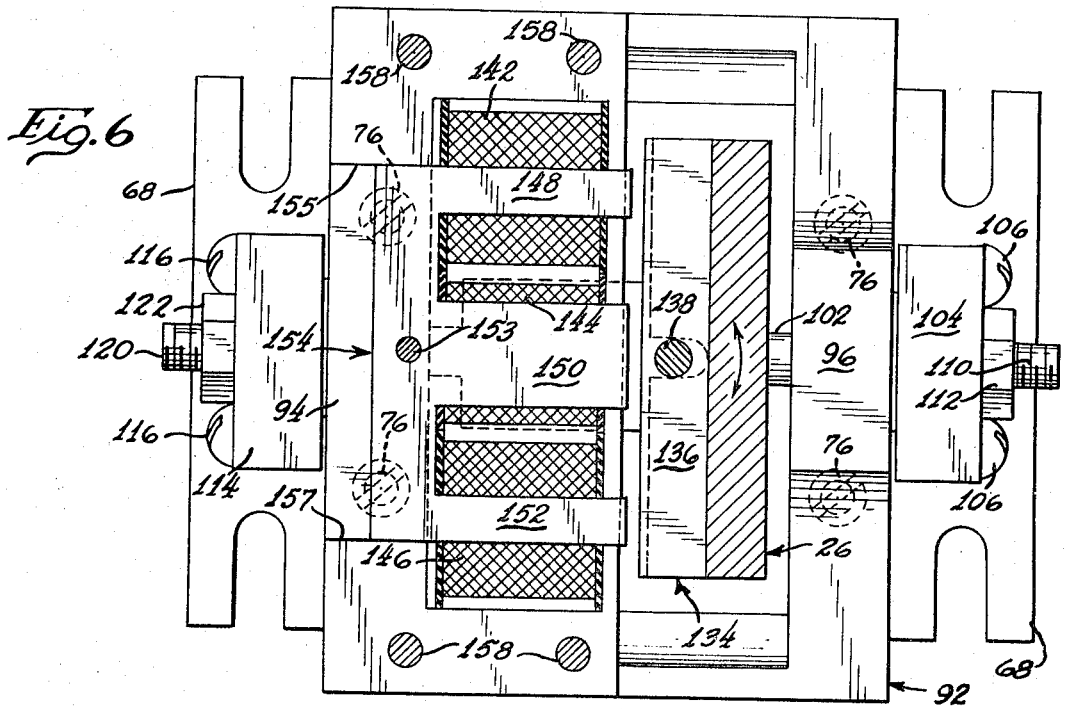
FIGURE 6 is an enlarged sectional view taken substantially along the line 6—6 of FIGURE 5.
Figure 7:
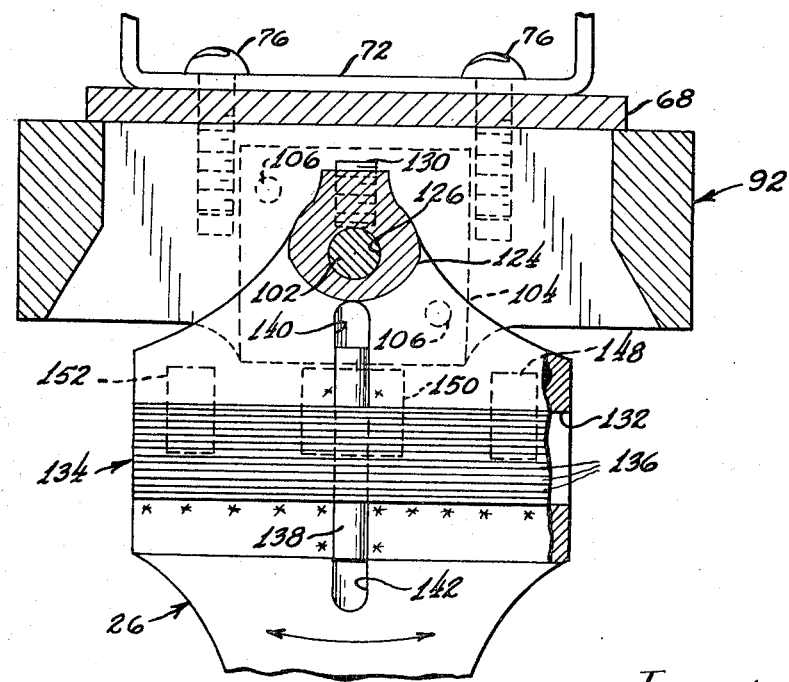
FIGURE 7 is an enlarged fragmentary sectional view taken substantially along the line 7—7 of FIGURE 5.

Referring now to FIGURE 6, three coils of wire 142, 144 and 146 are wound upon cores 148, 150 and 152, respectively, the cores comprising integral portions of a plurality of stacked lamina 154 which are substantially E-shaped in their configuration and are constructed of relatively thin ferro-magnetic sheets, the lamina being held in stacked relation by a pin 153. As shown in FIGURES 5 and 6, the stacked lamina 154 and coils 142, 144 and 146 are mounted in a recess 155, 157 formed in the pivot mounting member 92 and are retained in position by a coil retainer plate or base 156 (see FIGURES 4 and 5) which is secured to the pivot mounting member 92 by a plurality of screws 158. The retainer base 156 comprises a generally rectangular frame the upper side of which (as viewed in FIGURE 5) is recessed to receive the lower portion of the stacked lamina 154.

The pendulum 26, the pivot mounting member 92 and the coil retainer base 156 are preferably made from a non-magnetic metal, whereas the armature 134 is constructed of magnetic material and is located so that it can swing adjacent the magnetic cores 148, 150 and 152 of coils 142, 144 and 146. The coil 144 constitutes an excited coil and carries an alternating current, and coils 142 and 146 are in mutually inductive relation to coil 144 so that currents are induced in pickup coils 142 and 146. The flux path of the flux common to coils 144 and 142 and 144 and 146 includes the armature 134, and thus angular movement of the pendulum 26 about the axis of the pivot shaft 102 changes the relative position of the armature 134 and cores 148, 150 and 152. In this manner, angular movement of the pendulum 26 with the armature 134 changes the reluctances of the common flux paths causing the currents induced in the pickup coils 142 and 146 to vary depending upon the angular position of the pendulum 26.

FIGURES 4 and 5 show the reel housing 28 having a lug 162 which extends alongside an outer end portion 164 of the pendulum 26 and is secured thereto by a bolt 166 and nut 168. The reel housing 28 is formed with a pair of spaced wall portions 170 and 172 which carry a pair of adjusting screws 174 and 176, and the pendulum outer end 164 is formed with a nose 178 which projects between the inner ends of the adjusting screws. It will thus be seen that the reel housing 28 is rigidly mounted to the free end of the pendulum 26 and that the reel housing may be angularly adjusted about the axis of the bolt 166 relative to the pendulum 26 by adjustment of the two screws 174 and 176 which abut against opposite sides of the pendulum nose 178. In operation, the screws 174 and 176 are utilized as a mechanical means for adjusting the apparatus to electrical zero when the pendulum arm 26 is in a predetermined zero position.

A spring reel 180 is rotatably mounted to a cover plate 182 by means of a shaft 184, and the cover plate 182 is secured to the reel housing 28 by a plurality of screws 186. The reel 180 has the steel cable 30 wound thereon, and the cable 30 extends out of the housing through a small eyelet 188 formed therein. The reel 180 is biased in a counterclockwise direction as viewed in FIGURE 5 by a spring (not shown) so as to wind the cable 30 on the reel 180, and the spring is of a known type which will produce a substantially constant tension on the cable regardless of the amount by which the cable is drawn from the reel when in use.

It will be understood from the foregoing that the currents induced in the pickup coils 142 and 146 depend upon the angular position of the pendulum 26. This phenomenon is more fully described in the previously mentioned U.S. Patent 2,765,540, and the latter patent also describes a galvanometer and related apparatus located remote from the caster-camber unit 22 for measuring the current in a pair of pickup coils and producing a reading on a remote viewing screen. Because the toe arm 24 is plugged into the caster-camber unit 22, the electrical circuitry in the latter together with the remote reading device associated therewith may be used to advantage in combination with the toe measuring device of the present invention, although the present invention is not limited to such use and may if desired be constructed as a wholly independent toe measuring device.

In order to calibrate the apparatus of the present invention the assembly of the caster-camber unit 22 and toe arm 24 is suspended on one end of a calibration support bar (not shown) and the assembly of the caster-camber unit 22' and toe arm 24' is suspended on the opposite end of the same support bar. Each assembly should be balanced on the support bar by adjustment of the counterweights 50 and 50', and thereafter, for purposes of calibration, each assembly should be locked in position relative to the support bar. The two cables 30 and 30' are then interconnected at the ring 34 by the spring snaps 32 and 32'. Since the two toe measuring assemblies are supported on the opposite ends of the same support bar, a zero toe condition is simulated and both viewing screens of the remote reading device should indicate zero toe. If the readings are not zero, then, with reference to the unit shown in FIGURE 5, the cover plugs 88 and 90 are removed and a screw driver is used to turn the calibration adjusting screw 82 in a counterclockwise direction against its stop (not shown). The toe zero adjusting screw 84 is then turned until the corresponding remote indicator shows a zero toe reading. A mechanical zero adjustment is also provided as shown in FIGURE 4, such adjustment being accomplished by loosening one of the set screws 174 and 176 and tightening the other until a zero reading appears on the remote viewing screen.

In order to calibrate the range of the toe measuring unit, any desired fixture means (not shown) may be utilized to move the cable 30 in a horizontal plane at a point midway between the toe arms 24 and 24', such movement being transverse to the axis of the cable, i.e. forwardly or rearwardly as viewed in FIGURE 1. The cable is moved in one direction to simulate toe-in, and in the opposite direction to simulate toe-out, such movement being in predetermined increments which correspond to a known magnitude of toe-in or toe-out. For example, the cable 30 may be moved a predetermined increment known to correspond to a condition of ½ inch toe-out, and if necessary the calibration adjusting screw 82 of FIGURE 5 is turned until such a reading is provided on the remote viewing screen. The cable 30 is then moved the same predetermined increment in the opposite direction corresponding to a ½ inch toe-in reading, and if necessary the adjusting screw 82 is turned to produce the latter reading on the remote viewing screen. The other toe measuring unit 24' is of course calibrated in the same manner described above.

The operation of the toe measuring apparatus of the present invention will now be briefly reviewed. A wheel clamp or the like such as shown at 36 in FIGURE 2 is attached to each of the front wheels $W_L$ and $W_R$. The toe arm 24 is plugged into the caster-camber unit 22 by means of the plug 58, and is fixedly secured to the unit 22 by means of the two adapter screws 54 and 56. In a similar manner, the toe arm 24' is plugged into and fixedly secured to the caster-camber unit 22', and the units 22 and 22' are both electrically connected to the remote indicating apparatus (not shown). The assembly of the unit 22' and toe arm 24' is freely suspended on the adapter spindle 44 as shown in FIGURE 2 and is carefully balanced thereon by adjusting the counterweight 50' while observing the spirit level 60'. In a similar manner, the assembly of the unit 22 and toe arm 24 is suspended on an adapter spindle 44 associated with the left front wheel $W_L$ and the assembly is balanced by adjustment of the counterweight 50. The two cables 30 and 30' are then drawn from their respective spring reels 28 and 28' and pulled transversely across the vehicle in front of the wheels $W_L$ and $W_R$ so as to be connected at the ring 34 by means of the spring snaps 32 and 32'.

It will be understood that if the two wheel spindles for the wheels $W_L$ and $W_R$ were in perfect alinement as in the case of the two ends of the calibration support bar described earlier, then the two adapter spindles 44 would also be in perfect alinement and the two remote viewing screens would each indicate zero toe readings. In other words, the angular position of the pendulum 26 and armature 134 relative to the cores 148, 150 and 152 would be the same as when the toe measuring units were mounted on the calibration support bar, and would thus produce a zero toe reading or depending on the position of the wheels the two toe readings would add up to zero.

Accordingly, and toe-in or toe-out of the wheels $W_L$ and $W_R$ will alter the angular positions of the pendulum and armature assemblies relative to the core members associated therewith so as to alter the current induced in the pick-up coils 142 and 146 of each of the devices 24 and 24' thereby producing a toe-in- or toe-out reading on the remote viewing screens associated therewith. The total toe reading is obtained by adding together the readings for the two wheels $W_L$ and $W_R$, or by first turning the wheels so that one of the remote viewing screens indicates a zero toe reading and then reading the total toe from the other viewing screen. It will now be understood from the foregoing that a calibrated current measuring instrument such as a galvanometer is employed to measure the unbalanced condition of the current through the two pickup coils 142 and 146 of each of the two toe measuring devices in order to interpret the angular positions of the two pendulums 26 and 26' in terms of current flow. The current measuring instrument may comprise a galvanometer located remote from the vehicle so as to measure differences in the induced current in the pickup coils and indicate a reading at a remote control panel or the like.

It would be possible to fix the assembly of the caster-camber unit 22 and toe arm 24 to the adapter spindle 44 after balancing the assembly thereon and still obtain a proper toe reading. However, when adjusting the tie rods of the vehicle in order to adjust the wheel toe to a desired value, such adjustment of the tie rods in effect constitutes a turning of the wheels thereby causing the arm 24 to be moved out of its horizontal position. As a result, if the toe arm is fixed relative to the adapter spindle 44, then after some adjustment of the tie rods the toe reading will not be accurate. On the other hand, if the toe arm 24 is balanced on the adapter spindle 44 and remains free to pivot thereon, the toe arm 24 will remain in a balanced horizontal position and continue to produce accurate toe readings on the remote viewing screen even after adjustment of the tie rods.

The toe measuring apparatus described herein possesses significant advantages over the toe device described in the previously mentioned U.S. Patent 2,765,540. The latter device requires the use of the two reference plates or abutment plates which must be precisely mounted from the vehicle runway so as to be parallel to one another, and to make a toe determination such reference plates must be moved inwardly into face-to-face relation with abutment plates carried by the two pendulum arms thereby causing the pendulum abutment plates to assume a perfectly parallel relation. However, if toe-in or toe-out exists then the pendulum plates will not be square relative to the mechanism associated therewith and they will act through a gear and pinion to vary a resistance in an electrical bridge circuit causing a variation in current flow which is readable on a remote galvanometer or the like as a toe-in or toe-out reading. However, the foregoing known device requires that the vehicle be positioned with substantial care on the runway so as to be approximately parallel to the runway. On the other hand, the present invention eliminates the need for squaring up the vehicle on the racks or runway and also completely eliminates the need for any reference plates mounted from the runway.

It is an important feature of the present invention that the pendulum 26 is mounted in a substantially frictionless manner. As shown in FIGURE 5, the pivot shaft 102 has its ends supported in the ball bearings 98 and 100 with thrust taken out by the bearing balls 108 and 118, and except for the foregoing bearing supports the pendulum assembly is free from engagement with other components. In particular, the armature 134 produces variances in current flow as it moves relative to the cores 148, 150 and 152 while remaining out of contact with the latter. Such an arrangement is much preferred over the rack and pinion members shown in U.S. Patent 2,765,540 since the latter device will produce significantly more frictional resistance to movement of the pendulum arm than the device of the present invention. FIGURE 4 shows an opening 190 formed in the toe arm head 48 so as to permit the pendulum 26 to project therethrough, and it will be seen that a pair of rubber bumpers 192 and 194 are mounted on opposite sides of the pendulum arm so as to cooperate with the sides of the opening 190 in limiting the amount by which the pendulum arm may swing.

Reference is now made to FIGURES 8 and 9 which disclose an alternative embodiment of the invention in which the reel housings 28 and 28' and cables 30 and 30' are eliminated and in place thereof a tension spring 200 is stretched between the two pendulums 26 and 26'. An adjusting bracket 202 is mounted on the end of the pendulum 26 by a bolt 204 and nut 206. The bracket 202 is provided with a pair of lugs 208 and 210 which project on opposite sides of the pendulum nose 178 and carry adjusting screws 212 and 214 for engagement with the pendulum nose. The adjusting screws 212 and 214 may be utilized to provide an electrical zero toe adjustment in the same manner as previously described in conjunction with the adjusting screws 174 and 176 of FIGURE 4.

The oppositely disposed pendulum arm 26' has an adjusting bracket 202' mounted on the end thereof by a bolt 204' and nut 206', and the bracket includes a pair of lugs 208' and 210' which project on opposite sides of the pendulum nose 178' and carry adjusting screws 212' and 214'. A tube 216 is telescoped over the tension spring 200 and as shown in FIGURE 9 the tube extends substantially the full length of the spring 200 when the latter is retracted. The opposite ends of the tension spring 200 are equipped with hooks 218 and 218' which permit the spring ends to be connected to rings 220 and 220' carried by the two brackets 202 and 202'. The tension spring 200 functions in substantially the same manner as the spring-loaded cables 30 and 30' but eliminates any possible problem relative to the coiling of the cables on the spring reels 180 and 180'.

While I have described my invention in certain preferred forms, I do not intend to be limited to such forms, since modifications coming within the scope of my invention will readily occur to those skilled in the art, particularly with my disclosure before them.

I claim:

1. Apparatus for measuring the toe of automotive vehicle wheels, the improvement comprising, in combination, first toe arm means removably supportable from a left front vehicle wheel, second toe arm means removably supportable from a right front vehicle wheel, first pendulum means carried by said first toe arm means and movable relative thereto about a generally vertical axis, second pendulum means carried by said second toe arm means and movable relative thereto about a generally vertical axis, tension means adapted to be stretched between the free ends of said first and second pendulum means for urging the same toward one another, and first and second toe indicating means responsive to the angular positions of said first and second pendulum means respectively for providing signals which are a measure of the the toe of said left and right vehicle wheels, said tension means comprising at least one spring reel having a cable removably wound thereon, and said spring reel being connected to the free end of one of said pendulum means.

2. Apparatus for measuring the toe of automotive vehicle wheels, the improvement comprising, in combination, first toe arm means removably supportable from a left front vehicle wheel, second toe arms means removably supportable from a right front vehicle wheel, first pendulum means carried by said first toe arm means and movable relative thereto about a generally vertical axis, second pendulum means carried by said second toe arm means and movable relative thereto about a generally vertical axis, tension means adapted to be stretched between the free ends of said first and second pendulum means for urging the same toward one another, and first and second toe indicating means responsive to the angular positions of said first and second pendulum means respectively for providing signals which are a measure of the toe of said left and right vehicle wheels, said first and second toe indicating means each comprising electrical means which produces an electrical current the magnitude of which is a measure of the angular position of the corresponding pendulum means.

3. Apparatus for measuring the toe of automotive vehicle wheels, the improvement comprising, in combination, first toe arm means removably supportable from a left front vehicle wheel, second toe arm means removably supportable from a right front vehicle wheel, first pendulum means carried by said first toe arm means and movable relative thereto about a generally vertical axis, second pendulum means carried by said second toe arm means and movable relative thereto about a generally vertical axis, tension means adapted to be stretched between the free ends of said first and second pendulum means for urging the same toward one another, and first and second toe indicating means responsive to the angular positions of said first and second pendulum means respectively for providing signals which are a measure of the toe of said left and right vehicle wheels, said first and second toe indicating means including ferro-magnetic armature means carried by each of said pendulum means, and electromagnetic inductive means having ferro-magnetic cores carried by each of said toe arm means in a position adjacent a path of movement of said armature means, said armature means serving to vary the current induced in said inductive means depending upon the angular position of said pendulum means whereby the magnitude of said current constitutes a measure of the angular position of said pendulum means.

4. Apparatus for measuring the toe of automotive vehicle wheels, the improvement comprising, in combination, first toe arm means removably supportable from a left front vehicle wheel, second toe arm means removably supportable from a right front vehicle wheel, first pendulum means carried by said first toe arm means and movable relative thereto about a generally vertical axis, second pendulum means carried by said second toe arm means and movable relative thereto about a generally vertical axis, tension means adapted to be stretched between the free ends of said first and second pendulum means for urging the same toward one another, each end of said tension means being connected to the free end of a corresponding one of said pendulum means by rigid connecting means including vertical pivot pin means, adjustable means for varying the angular position about said vertical pivot pin means of the end of said tension means relative to said free end of said pendulum means, said adjustable means thereby facilitating adjustment of said apparatus for a zero toe reading, and first and second toe indicating means responsive to the angular positions of said first and second pendulum means respectively for providing signals which are a measure of the toe of said left and right vehicle wheels.

5. Apparatus for meauring the toe of automotive vehicle wheels, the improvement comprising, in combination, first toe arm means removably supportable from a left front vehicle wheel, second toe arm means removably supportable from a right front vehicle wheel, first pendulum means carried by said first toe arm means and movable relative thereto about a generally vertical axis, second pendulum means carried by said second toe arm means and movable relative thereto about a generally vertical axis, tension means adapted to be stretched between the free ends of said first and second pendulum means for urging the same toward one another, and first and second toe indicating means responsive to the angular positions of said first and second pendulum means respectively for providing signals which are a measure of the toe of said left and right vehicle wheels, each of said first and second toe arm means being provided with adjustable counterweight means for balancing the toe arm means in a horizontal position when supported from a corresponding one of said vehicle wheels.

6. Apparatus for measuring the toe of automotive vehicle wheels, the improvement comprising, in combination, first toe arm means removably supportable from a left front vehicle wheel, second toe arm means removably supportable from a right front vehicle wheel, first pendulum means carried by said first toe arm means and movable relative thereto about a generally vertical axis, second pendulum means carried by said second toe arm means and movable relative thereto about a generally vertical axis, each of said first and second pendulum means having ferro-magnetic armature means mounted thereon, electromagnetic inductive means having ferromagnetic cores carried by each of said first and second toe arm means in a position adjacent a path of movement of the corresponding armature means, said armature means serving to vary the current induced in said inductive means depending upon the angular position of said pendulum means whereby the magnitude of said current constitutes a measure of the angular position of said pendulum means, tension means adapted to be stretched between the free ends of said first and second pendulum means for urging the same toward one another, each end of said tension means being connected to the free end of a corresponding one of said pendulum means by rigid connecting means including vertical pivot pin means, adjustable means for varying the angular position about said vertical pivot pin means of the end of said tension means relative to said free end of said pendulum means, said adjustable means thereby facilitating adjustment of said apparatus for a zero toe reading, and counterweight means provided on each of said toe arm means for balancing the latter in a horizontal position when supported from a corresponding one of said vehicle wheels.

7. The invention of claim 6 where said tension means comprises a tension spring which is stretched between the free ends of said first and second pendulum means.

References Cited

UNITED STATES PATENTS

| | | | |
|---|---|---|---|
| 2,765,540 | 10/1956 | MacMillan et al. | 33—203.18 |
| 3,181,248 | 5/1965 | Manlove | 33—203.18 |
| 3,188,747 | 6/1965 | Race | 33—203.18 |
| 3,199,208 | 8/1965 | Hunter | 33—203.18 |

WILLIAM D. MARTIN, JR., *Primary Examiner.*